No. 849,525. PATENTED APR. 9, 1907.
E. O. BARNES.
VEHICLE WHEEL.
APPLICATION FILED AUG. 25, 1906.

WITNESSES:
INVENTOR
E. O. Barnes,
BY Franklin N. Hough
Attorney

UNITED STATES PATENT OFFICE.

EARL OLVER BARNES, OF BROOKLYN, NEW YORK.

VEHICLE-WHEEL.

No. 849,525.        Specification of Letters Patent.        Patented April 9, 1907.

Application filed August 25, 1906. Serial No. 332,006.

*To all whom it may concern:*

Be it known that I, EARL OLVER BARNES, a citizen of the United States, residing at Brooklyn, in the county of Kings and State of New York, have invented certain new and useful Improvements in Vehicle-Wheels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in vehicle-wheels, the object of the invention being to provide a wheel having a yielding rim, whereby vibrations may be taken up, and consists, essentially, of a series of spokes fixed at their inner ends to a hub and recessed at their outer ends to receive rods which have play within said recesses and fastened to the rim of the wheel, springs being provided which bear between the outer rim and an inner fixed band, thereby allowing the portion of the rim which comes in contact with an obstruction or rough surface to yield and afterward resume its normal position.

The invention comprises various details of construction and combinations and arrangements of parts, which will be hereinafter fully described and then specifically defined in the appended claim.

My invention is illustrated in the accompanying drawings, in which—

Figure 1:
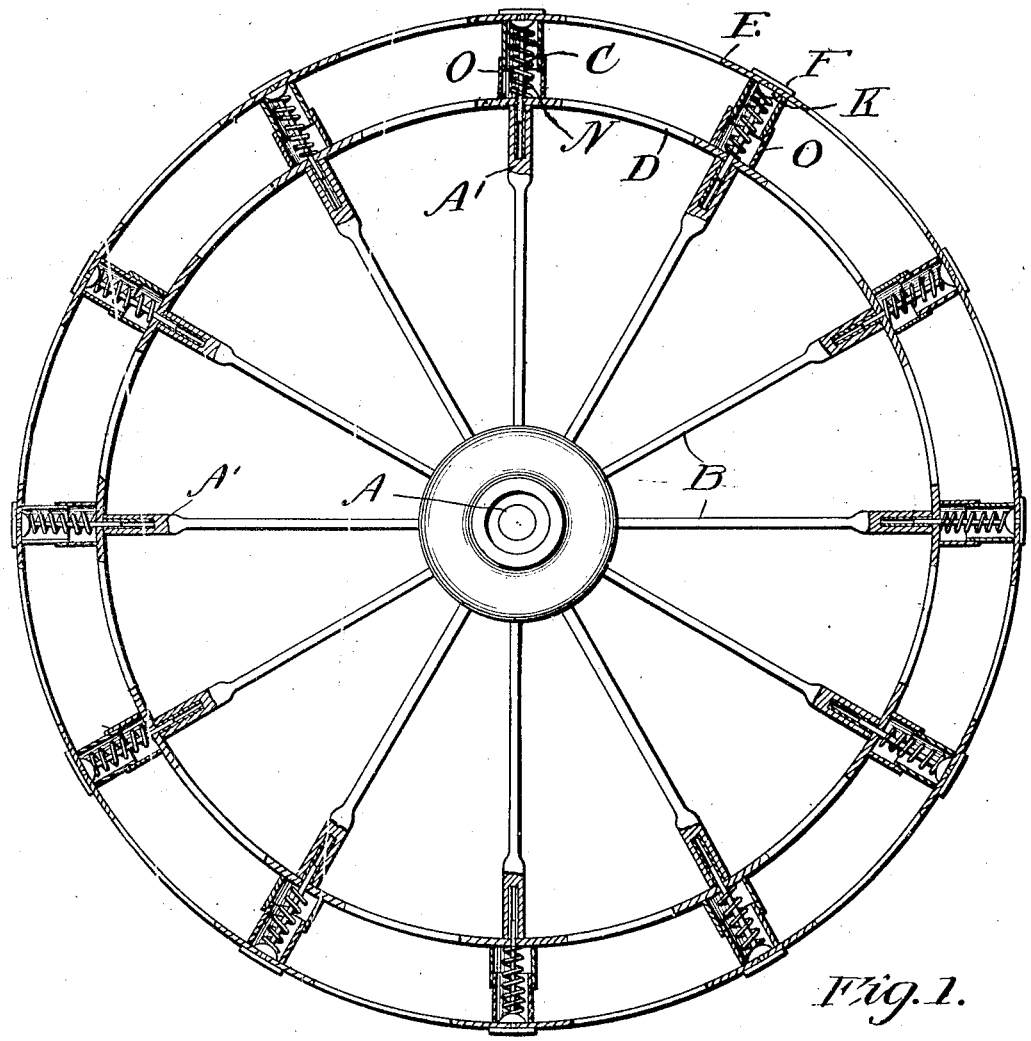
Figure 2:
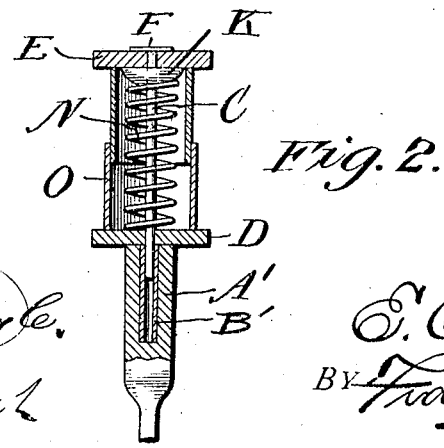

Figure 1 is a sectional view through a wheel made in accordance with my invention, and Fig. 2 is a transverse sectional view through the rims and connecting parts.

Reference now being had to the details of the drawings by letter, A designates the hub of a wheel from which radiate spokes B, securely fastened thereto. The outer end of each spoke is slightly flaring, as at A', and is recessed longitudinally, each recess being adapted to receive a rod C, which has a longitudinal play within the recess. Each recess has preferably a lining B' in order to prevent wear upon the surface of the recess.

D designates an inner rim or band which is fixed to the outer ends of the spokes and has apertures therein which are adapted to register with the recesses in the ends of the spokes.

E designates an outer rim having a series of apertures in its tread-surface adapted to receive the rods, to each of which a plate is fastened. Upon each rod is a knob K, which reinforces the connection between the rod and plate and serves, with assistance of rod C, to prevent the outer part of the wheel from turning inside out when going around a curve at a high speed.

N N designate spiral springs which are placed one about each rod C and interposed between the outer and inner rims.

In order to keep sand, dust, or other foreign matter free from the springs, a flexible casing O is preferably placed about the springs and between the rims.

From the foregoing it will be noted that by the provision of a wheel embodying the features of my invention a simple and efficient means is afforded whereby the various parts of the wheel may yield when coming in contact with rough or uneven surfaces, thereby taking up the vibration which would otherwise come upon the vehicle mounted upon the wheels.

What I claim is—

A wheel having a hub with radiating spokes, the outer end of each spoke being widened and recessed, an inner rim fastened to the outer end of each spoke and provided with a shell, an outer rim having a series of apertures therein, a rod passing through the two rims and adapted to telescope within the recess in the end of a spoke, a knob fixed to said rod and bearing against the inner surface of the outer rim, a spring interposed between said knob and the inner rim, and a second shell surrounding said knob and rod and telescoping within said first-mentioned shell, as set forth.

In testimony whereof I hereunto affix my signature in the presence of two witnesses.

EARL OLVER BARNES.

Witnesses:
THOMAS FAY,
WILLIAM GODFREY.